United States Patent [19]

Savin

[11] Patent Number: 5,677,367

[45] Date of Patent: Oct. 14, 1997

[54] GRAPHITE-CONTAINING COMPOSITIONS

[76] Inventor: Ronald R. Savin, 11001 Muirfield Dr., Rancho Mirage, Calif. 92270

[21] Appl. No.: 613,032

[22] Filed: Mar. 8, 1996

Related U.S. Application Data

[63] Continuation-in-part of Ser. No. 505,167, Aug. 15, 1995, Pat. No. 5,580,907.

[51] Int. Cl.$^6$ .................................................... C08J 9/32
[52] U.S. Cl. .................... 523/219; 523/244; 523/424; 523/443; 523/444; 523/451; 523/457; 523/459; 523/516; 523/527
[58] Field of Search ................................. 523/216, 219, 523/244, 457, 459, 514, 516, 527, 495, 496, 424, 451, 443, 444; 252/503, 511

[56] References Cited

U.S. PATENT DOCUMENTS

| | | | |
|---|---|---|---|
| 3,440,181 | 4/1969 | Olstowski | 252/503 |
| 3,446,770 | 5/1969 | King et al. | 524/439 |
| 3,838,495 | 10/1974 | Kuhnert | 219/91 |
| 3,998,771 | 12/1976 | Feneis, Jr. et al. | 523/451 |
| 4,014,703 | 3/1977 | Hayati et al. | |
| 4,052,354 | 10/1977 | Beiter et al. | |
| 4,081,423 | 3/1978 | Hardenfelt | 523/512 |
| 4,208,452 | 6/1980 | Keithler | |
| 4,209,555 | 6/1980 | Stewart | |
| 4,243,416 | 1/1981 | Grourke et al. | |
| 4,365,003 | 12/1982 | Danforth | |
| 4,391,646 | 7/1983 | Howell | |
| 4,411,742 | 10/1983 | Donakowski et al. | 204/16 |
| 4,417,007 | 11/1983 | Salensky et al. | 523/459 |
| 4,474,685 | 10/1984 | Annis | 523/459 |
| 4,545,926 | 10/1985 | Fouts, Jr. et al. | 523/137 |
| 4,571,268 | 2/1986 | Frain et al. | |
| 4,621,024 | 11/1986 | Wright | 427/204 |
| 4,623,390 | 11/1986 | Delmonico | |
| 4,748,194 | 5/1988 | Geeck | |
| 4,789,194 | 12/1988 | Geeck | 523/459 |
| 4,799,959 | 1/1989 | Fourez et al. | 106/14.21 |
| 4,885,324 | 12/1989 | Hegedus et al. | 524/204 |
| 4,888,056 | 12/1989 | van der Kolk et al. | |
| 4,891,394 | 1/1990 | Savin | 523/459 |
| 4,996,085 | 2/1991 | Sievers | |
| 5,098,938 | 3/1992 | Savin | 523/443 |
| 5,167,701 | 12/1992 | Savin | 252/396 |
| 5,182,318 | 1/1993 | Savin | 523/463 |
| 5,213,846 | 5/1993 | Tsuneta et al. | 427/386 |
| 5,252,632 | 10/1993 | Savin | |
| 5,275,707 | 1/1994 | Yamada et al. | 204/181.1 |
| 5,284,888 | 2/1994 | Morgan | 524/93 |
| 5,334,631 | 8/1994 | Durand | |
| 5,336,303 | 8/1994 | Cocks | |
| 5,338,348 | 8/1994 | Savin | |
| 5,384,345 | 1/1995 | Naton | 523/219 |
| 5,399,189 | 3/1995 | Glorieux | 523/218 |
| 5,413,628 | 5/1995 | Savin | |

FOREIGN PATENT DOCUMENTS

| | | | |
|---|---|---|---|
| 2065828 | 10/1992 | Canada | |
| 2074329 | 1/1993 | Canada | |
| 0157392 | 10/1985 | European Pat. Off. | 524/434 |
| 2602239 | 2/1988 | France | |
| 2101577 | 7/1972 | Germany | |
| 59-051958 | of 1984 | Japan | |
| 9605257 | 2/1996 | WIPO | |

OTHER PUBLICATIONS

Zinc Dust and Powder—International Lead Zinc Research Organization, pp. 7 to 17 (1982).
Recent Developments in Organic Zinc–Rich Primers—Dr. Ignatius Metil, IMCO Laboratories, Inc., Buffalo, NY (Undated).
Epoxy Resins Chemistry and Technology—Second Edition—Clayton A. May, Arroyo Research and Consulting Corp., Watsonville, California, Marcel Dekker, Inc., pp. 810 to 814 (1989).

*Primary Examiner*—Veronica P. Hoke

[57] ABSTRACT

Disclosed herein is a precursor powder composition comprising a resin, a combination of zinc dust, zinc powder and zinc-coated microspheres and graphite, said powder being soluble in a solvent blend at a facility remote from the powder manufacturing facility, thereby, decoupling the powder manufacturing process from the end use of the powder which could be in a traditional solvent-based paint. Also disclosed are coating compositions for use in protecting metallic substrates from corrosion, comprising necessary additives and film forming substances including alkyl silicate, epoxy resins, powder and non-powder, and polyester resins, all the compositions being modified with about 4 to about 20 weight percent graphite powder based on total weight of the composition.

36 Claims, No Drawings

GRAPHITE-CONTAINING COMPOSITIONS

This application is a continuation in part of U.S. application Ser. No. 08/505,167 filed on Aug. 15, 1995, now U.S. Pat. No. 5,580,907.

FIELD OF THE INVENTION

This invention relates generally to dry compositions comprising graphite dispersed uniformly therethrough for use in coating compositions for protecting metallic substrates. A binder/vehicle and metallic zinc in various forms and are also necessary ingredients. Such compositions may be susceptible to easy dissolution at a remote site so as to decouple the manufacturing process for the dry composition from the addition of any solvents, organic or otherwise, for the manufacture of a coating composition.

BACKGROUND OF THE INVENTION

The outstanding corrosion resistance afforded by galvanizing has made it the most effective means for the long term protection of steel from oxidation (rusting) and subsequent corrosion. It is the conventional method of providing protection for guardrails, transmission towers, light poles, electrical equipment and dozens of other specific applications. Five mils or 125 microns of galvanizing will protect exposed equipment for a period in excess of 20 years. Guardrails may be coated with an average deposition of 75 microns and provide approximately 10 years of corrosion protection in an average rainfall environment. Galvanizing is applied both by hot dipping and electroplating, in applications where surface coatings do not provide adequate corrosion resistance.

Galvanizing coating compositions, also referred to as "zinc-rich primers", are made from zinc metal and become oxidized only when exposed to the elements. The high conductivity of galvanizing compositions provides excellent cathodic protection to steel (which acts as the cathode, zinc being the anode), when exposed to a saline environment or other forms of oxidation caused primarily by water in its various forms, moisture, vapor and ice. Zinc-rich primers have been considered to be optimum anti-corrosion coatings on iron or steel substrates. However, certain problems have restricted their use as industrial type primers. The action of zinc in inhibiting rust is based on an electrochemical interaction between the zinc and the steel substrate. In order not to insulate the zinc particles from each other and from the substrate the prior art has considered it necessary to use very little binder, with satisfactory corrosion protection achieved only when the zinc to binder ratio is at least about 8.5:1.5 to 9.5:0.5. The high zinc level and the relatively high density of zinc often cause undesirable settling during short term storage. Hence, the zinc is often added just prior to application and mixed rapidly during application to prevent settling and clogging of spray equipment. This deters efficient field use.

Zinc rich primers have traditionally been limited to application over blasted and untreated steel. Passivation promotes adhesion to metal and includes the application of zinc phosphate or iron phosphate on to the steel substrate. The primary reason that zinc rich primers are not applied over iron phosphated steel is that these primers do not possess sufficient conductivity to provide cathodic protection to iron phosphated steel.

U.S. Pat. No. 3,998,771, issued December, 1976 to T. J. Feneis, Jr. et al. discloses water-based coating compositions for application on iron supports to obtain anti-corrosive coatings. Single phase compositions in this patent include about 2% to 10% by weight of a non-volatile liquid epoxy resin, with low viscosity, derived from bisphenol A and an epihalohydrin, e.g., epichlorohydrin; about 2% to 10% by weight of a modified polyamide, i.e., an addition product of a water soluble polyamide and a liquid epoxy resin; and about 55% to 70% by weight of a zinc pigment having an average particle size of about 2 to 15 microns.

U.S. Pat. No. 4,417,007, issued November 1983 to G. A. Salensky et at, discloses a one component composition containing from about 4% to 25% by weight epoxy or phenoxy resin binder and a polyamine hardener, about 43% to 90% by weight zinc dust, about 3% to 38% by weight $Mn_3O_4$ fume pigment, up to 35% by weight additional pigments including pigment extenders and fillers (such as talc, clays, diatomaceous silica and silica), up to 5% by weight pigment suspension agent (such as hydrous magnesium silicate and lecithin), and balance organic solvents. A 1:1 volume ratio of zinc dust to $Mn_3O_4$ is preferred.

U.S. Pat. No. 4,474,685, issued Oct. 2, 1984 to N. Annis, discloses a molding composition comprising a polymeric binder and a multi-component electroconductive filler system comprising at least 2 members selected from the group consisting of particles of carbon black, graphite and conductive metals, said metals being selected from any of aluminium, copper, zinc or steel.

U.S. Pat. No. 4,885,324, issued Dec. 5, 1989 to Hegedus et al., discloses a coating for metallic or polymeric composite substrates, which may be used both as a primer and as a topcoat, comprising a 2-component aliphatic polyurethane binder, with titanium dioxide, zinc molybdate, zinc phosphate and organic zinc salt and titanium dioxide in controlled amounts. No graphite or use thereof is disclosed in this patent.

U.S. Pat. No. 4,891,394, issued in January 1990 to the applicant of the present invention, discloses a coating composition for the protection of metallic and non-metallic substrates against environmental attack, comprising about 10% to about 25% by weight of a film-forming polymer which may be epoxy resins having an epoxide value of about 250 to 2500, vinyl chloride resins copolymerized with polyisocyanates, and/or vinyl chloride resins copolymerized with melamines; about 30% to about 60% by weight particulate metallic zinc; an agent for control of electrical conductive characteristics comprising a crystalline silica having an oil absorption value of less than 20 as measured by ASTM Test D281-84, the volumetric ratio of such agent to the metallic zinc ranging from about 0.7:1 to about 1.25:1; about 2% to about 3% by weight of an agent for control of theological characteristics comprising a pyrogenic amorphous silica having an average particle size less than about 0.012 micron; and at least one solvent compatible with the polymer.

French patent application 2,602,239, published Feb. 19, 1988 in the name of the applicant of the present invention, discloses a two phase coating composition containing up to 70% by weight of a powdered metal (based on the total weight of the composition after admixture), from about 2% to 30% of a film-forming polymer, about 2% to about 30% of a hardener for the polymer, at least 1.8% to 30% of an agent for control of rheological characteristics, and up to 30% by weight organic solvents. The preferred polymer is an epoxy resin having an average molecular weight of 350 to 3800. The agent for control of rheological characteristics comprises at least one pyrogenic silica and optionally at least one natural or transformation silica having an oil absorption value preferably not greater than 90 and more preferably not greater than 40. In the specific examples, pyrogenic silicas were used having average particle sizes of about 0.014 micron, about 0.007 micron and about 0.008 micron.

U.S. Pat. No. 4,748,194, issued May 1987 to Geeck, discloses a coating composition for the protection of gas tanks, comprising a powder metal (such as zinc, cadmium, stainless steel, aluminum, alloys or mixtures thereof), a linear epoxy or phenoxy resin having a molecular weight of less than 15,000 cross-linked with a blocked isocyanide, a suspension agent, a thixotropic agent, and "active" and "inactive" organic solvents. The proportion of powdered metal present ranges from 13 to 52 parts per hundred. The suspension agent disclosed in this patent is polyethylene, and the thixotropic agent is silane- treated silicon dioxide, in amounts up to 2 parts per hundred.

U.S. Pat. No. 4,621,024, issued Nov. 4, 1986 to F. A. Wright, discloses metal coated microspheres and a process for preparation of the microspheres. Particulate zinc, aluminum, silver, copper, stainless steel, platinum, gold, or mixtures thereof, having an average particle size of about 6 to 10 microns, are bonded to the surfaces of non-conductive microspheres by means of a thermosetting adhesive coating on the microspheres with application of heat, followed by intermittent mixing in the absence of heat. The microspheres may be fly ash, comprising about 80%–96% by weight alma-silica, with minor amounts of iron oxide, alkaline earth metal oxides and alkali metal oxides. The adhesive binder preferably comprises an organo-functional silane and a copolymerizable monomer. In the final product the metal is from about 15% to about 30% by weight, relative to the weight of the adhesive binder-coated microspheres. Although this patent discloses average particle size diameters of metal coated microspheres ranging from about 60 to 180 microns, the assignee of this patent also produces zinc coated microspheres of smaller average diameters, e.g., about 2.5 to about 60 microns.

The use of zinc-coated microspheres disclosed in the above mentioned U.S. Pat. No. 4,621,024 in zinc-rich inorganic binder compositions has been proposed by the prior art, as a partial replacement for zinc dust. More specifically, substitution of between 20% and 40% by volume of zinc-coated microspheres, for the zinc dust, has been evaluated in a silicate primer (produced by Carboline Company of St. Louis, Mo., under the trademark "Carbo Zinc 11"). Silicate primers of this type have a very slow curing time, and also require blast cleaning of the metal substrate prior to deposition of the coating. These coatings are electrically conductive.

U.S. Pat. No. 5,182,318 ("the '318 patent"), by the applicant of the present invention, discloses a coating composition exhibiting improved resistance to corrosion of metallic substrates. The glass microspheres in the '318 patent are coated with zinc and are concentrated primarily at the exposed surface of a dry coating, so as to provide corrosion protection to the substrate. The '318 patent provides suitable conditions Coy solvent selection), for the hollow zinc-coated glass microspheres to rise to the surface of the coating, to provide the desired protection to the substrate.

U.S. Pat. No. 5,098,938, issued March 1992 to R. R. Savin, discloses a coating composition similar to that of the above-mentioned U.S. Pat. No. 4,891,394, wherein an epoxy resin film-forming binder is used, and wherein at least four different size grades of pyrogenic amorphous silicas are present within specified proportions and average particle sizes, together with a crystalline silica having an oil absorption value of less than 20 measured by ASTM Test D281-84.

Canadian Patent 2,065,828 provides a waterborne zinc-rich anticorrosion primer which is based upon the combination of metallic zinc dust with a stable aqueous dispersion of a particular chlorinated addition copolymer. This primer can be formulated without the need for significant mounts of organic co-solvents. There primers readily cure at ambient temperatures, allow overcoating shortly after drying, and produce films of desirable hardness, resiliency and adhesion both to the substrate and topcoat.

Canadian Patent 2,074,329 relates to an improved powder coating composition comprising (a) a resin, (b) a curing agent and (c) zinc, wherein the zinc is a mixture of (c1) lamellar zinc (zinc flakes) and (c2) zinc dust.

U.S. Pat. No. 5,167,701 issued December 1992 to the applicant of the present invention, discloses a one-package zinc-rich coating composition having an inorganic binder which provides protection of metallic substrates against environmental attack comprises, in volume percent: from about 55% to about 60% of an alkyl silicate solution having a solids content of about 35% to about 45% by weight; about 10% to about 14% zinc dust of at least one different particle size grade; about 0.5% to about 2.5% zinc flakes; about 3% to about 6% particulate ferrophosphate; about 10% to about 17% of a particulate crystalline silica having an oil absorption value of less than 20 measured by ASTM Test D 281-84; about 1% to about 2.5% of at least two different size grades of pyrogenic amorphous silicas having average particle sizes ranging from about 0.007 to about 0.04 micron; about 0.3% to about 0.5% of a wetting agent; and about 7% to about 8% of an anhydrous alcohol solvent.

Zinc powder has been used only rarely in zinc rich coating systems due to its large particle size, heavy sedimentation problems and has been ignored as an acceptable pigment. While the term "zinc powder" has been and continues to be used interchangeably with "zinc dust", as used herein "zinc powder" only means metallic zinc in granular form, having a particle size varying from about 20 microns to about 60 microns. As used herein "zinc powder" also is different from "lamellar zinc" or "zinc flakes", as used in the Canadian Patent 2,074,329, for reasons discussed above.

Organic coatings made from zinc dust provide only limited protection to bare metal due to its much lower conductivity than zinc metal caused by oxidation during its manufacturing process. In conventional zinc rich paints, the greater the conductivity the greater the area of adjacent bare steel that will be protected by the zinc metal. The level of adjacent bare metal protection is largely proportional to its conductivity measured in ohms/cm$^2$. All galvanizing compositions, prior to exposure, will measure total conductivity of 0.00 ohm/cm$^2$ at 75 micron deposition, whereas zinc dust-rich industrial and maintenance coatings will measure from 1 to several dozen ohms/cm$^2$ at 75 microns based on the percentage of zinc dust and the particle size of the zinc dust utilized. In order to provide adequate cathodic continuity, zinc incorporated in primers customarily contains between 80–95 weight percentage of zinc dust by total weight of the zinc and the binder, not including other additives. The high percentage of zinc dust provides improved conductivity which leads to improved cathodic protection, however, the high density and low binder content causes serious problems in handling and only moderate substrate adhesion.

Another consideration is that inorganic zinc dust-rich coating compositions are difficult to manufacture and store because of the irreversible curing mechanism triggered by exposure to moisture. Once the zinc dust has been added to a one package zinc primer in the manufacturing process, the moisture curing mechanism is activated. Exposure to a minimum relative humidity of 50% effectively cures these inorganic zinc rich coatings. Any exposure to moisture in the manufacturing or packaging process will destabilize the primer by premature curing, resulting in a product that will gel in the container in about two days. These coatings have therefore been manufactured in inert environments, using nitrogen blankets to prevent moisture contamination. One package longer shelf life zinc primer coatings have been marketed only in small volumes, since the nitrogen blanketing equipment necessary to produce such coatings in a stable form, is specialized and expensive.

Despite the sensitivity to moisture, inorganic zinc rich coating compositions continue to be the most used coatings to prevent environmental attack.

U.S. Pat. No. 5,338,348 ("the '348 patent") discloses a coating composition for use in protecting metallic substrates from corrosion, comprising in weight percent, based on the total weight of the composition: from about 7% to 35% of film-forming substance; from about 35% to 55% of zinc powder (as defined above); from about 5% to 25% of zinc flakes; from about 1% to 5% at least one kind of amorphous silica; and up to about 30% particulate ferrophosphate. No microspheres, zinc or glass, are utilized in the compositions of this invention.

U.S. Pat. No. 5,384,345, issued Jan. 4, 1995 to Naton, discloses a composition comprising a mixture of about 5 to 60 weight percent of at least one water-insoluble polymer, 1 to 30 weight percent of inorganic or synthetic resinous hollow microspheres and about 10% to 85% of at least one volatile organic liquid, which is a solvent for the water-insoluble polymer disclosed above. Preferably, these compositions may also contain, at least one solid particulate inorganic filler. The filler can be fumed silica.

U.S. Pat. No. 5,399,189, issued Mar. 21, 1995 to Glorieux, discloses anti-corrosive compositions for metals, said compositions comprising a curable binder of polyurethane, 0.5 to 6 weight percent based on the total weight of the composition before curing, of a filler selected from hollow expanded microspheres, having a diameter of one to 100 micrometers and optionally, at least one filler or additive. The filler may be zinc or a silicate or aluminum or an iron oxide.

U.S. Pat. No. 5,413,628 discloses a stable coating composition for use in protecting metallic substrates from corrosion, comprising in weight percent, based on the total weight of the composition: from about 7% to 35% of alkyl silicate as a film forming substance; from about 35% to 55% of zinc powder (as defined above); from about 5% to 25% of zinc flakes; from about 0.2 to 5% of at least one amorphous silica; and up to about 30% particulate ferrophosphate; wherein the alkyl silicate comprises, in weight percent, based on the weight of the alkyl silicate: from about 5% to 20% of tetraethyl orthosilicate.

PCT publication WO 96/05257 discloses a coating composition for use in protecting metallic substrates from corrosion, comprising in weight percent, based on the total weight of the composition: from about 10% to 20% of a film forming substance; from about 45% to 55% of zinc powder; from about 25% to 35% of zinc dust; from about 1.5% to 2.5% of hollow glass microspheres having diameters ranging from 1 to about 150 microns and a true density of 0.3 to 1.1; from about 2% to 15% by weight of the film forming substance, of a hardener; about 1% to 2% by weight of the film forming substance, of an amorphous silica; and about 0.3% to 1% of a flow control agent.

None of the above patents or patent applications disclose the use of graphite in corrosion prevention coatings. The use of graphite instead of conventional pigments in conductive coatings, results in improved overall electrical conductivity; lower overall specific gravity of the coating; improved tensile strength, flexibility, corrosion resistance, and water-vapor impermeability. All of the following patents disclose such use in one way or the other.

U.S. Pat. No. 3,838,495 issued Oct. 1, 1974 to Kuhnert, discloses a method of forming partially or completely closed sheet metal structures having a corrosion-resistant coating surface by welding together shaped metal parts to join the structures. The coating material is said to be electrically conductive and suitable for welding. Broadly speaking, the coating material is said to have a high metal and/or graphite content and a hardenable bonding agent. Preferably, the coating material is said to contain at least 50% by weight of at least one material selected from metals and graphite. While Kuhnert allows for the use of zinc in combination with graphite, no specific example is revealed, wherein such a combination is utilized.

U.S. Pat. No. 4,081,423, issued Mar. 28, 1978 to Hardenfelt discloses a coating composition for producing a metallic appearance including an organic binder containing a finely divided metallic powder of a grain size not exceeding 1 mm and further including a substantial amount of powdered graphite.

U.S. Pat. No. 4,545,926, issued Oct. 8, 1985 to Fouts, Jr. et al., discloses conductive polymer compositions, comprising a polymeric material having dispersed therein conductive particles composed of a highly-conductive material and at least one particulate filler. A first particulate filler comprises a metal selected from nickel, tungsten, molybdenum, iron, chromium, aluminium, copper, solar, gold, platinum, tantalum, zinc, cobalt, brass, tin, titanium and nichrome. A second particulate filler comprises a non-metallic conductive material such as carbon black or graphite.

U.S. Pat. No. 5,284,888 discloses a corrosion inhibiting, EMI/RFI shielding composition comprising a polyurethane resin which comprises a hydroxy or amine functional first polymer and an isocyanide, or isocyanurate terminated second polymer, a stabilized conductive filler, and an azole. The term "stabilized conductive filler" as used herein refers to any electrically conductive filler which has been treated such that the surfaces of the filler particles are protected from oxidation and the filler remains electrically conductive after such treatment. These stabilized fillers, when used in the coating compositions of the invention, have been found to greatly increase the resistance of the coated substrates to corrosion, especially during long term exposure to salt fog or heat, while maintaining sufficient electrical conductivity to provide EMI/RFI shielding. Fillers which may be stabilized include, but are not limited to nickel coated graphite containing fibers. The invention further provides a method of composition a substrate with a composition of the invention in order to provide EMI/RFI shielding and prevent corrosion, and a substrate thus coated. It is to be noted that by coating the graphite, this invention teaches against the use of graphite by itself.

In Japanese Patent Publication No. 24566/74, there is found an example of two-layer electrodeposition by electrodeposition coating. The method of this Japanese Patent Publication No. 24566/74 is concerned with a method in which using black iron oxide as an essential component and an anionic electrodeposition paint composition as a vehicle, an article to be coated is subjected to electrodeposition coating and baked to form an electrically conductive coating film with marked properties regarding adhesive strength, electrical conductivity, surface characteristics, and corrosion resistance, and a second coating layer is further provided thereon by electrodeposition coating. In Japanese Patent Kokai (Laid-Open) No. 51958/84, in order to improve the quality of the method of the aforesaid Japanese Patent Publication No. 24566/74, a coating film as a first coating layer is formed from a combination of a cationic electrodeposition paint composition with, as an electrically conductive substance, finely divided carbon, i.e., carbon black and/or graphite, whereby uniformity of the resulting coating film and high throwing property are attained, and in order to further improve the corrosion resistance, lead compounds such as, for example, lead silicate, lead chromate, lead acetate, or lead lactate are added.

U.S. Pat. No. 5,275,707 discloses a method of coating a metal article by forming a first electrodeposition coating layer having varistor properties on a metal article by an electrodeposition coating method by use of an electrodeposition coating film-forming composition containing from 7 to 50 parts by weight of an electrically semiconductive substance per 100 parts by weight of the solid content of the composition, and then forming a second electrodeposition coating layer on said first electrodeposition coating layer by an electrodeposition coating method by use of an anionic or cationic electrodeposition paint while applying a voltage exceeding the varistor voltage. The coating composition thus-produced has excellent varistor properties with superior corrosion resistance.

U.S. Pat. No. 5,275,707 discusses Japanese Patent Publication No. 24566/74 and Japanese Patent Kokai (Laid-Open) No. 51958/84 thusly:

"[I]n the case that carbon black and/or graphite which is finely divided carbon is used as an electrically conductive substance as in Japanese Patent Kokai (Laid-Open) No. 51958/84, since the electrodeposition coating is carried out by using a cationic electrodeposition paint composition but not an anionic electrodeposition paint composition, the corrosion resistance of a formed coating film is improved. However, since carbon black and/or graphite does not basically have rust resistivity, the electrodeposition paint is inferior to usual cationic electrodeposition paints free from carbon black and/or graphite in terms of the rust resistivity, i.e., corrosion resistance. Moreover, though it is described that in order to improve this corrosion resistance, it is preferable to add a lead compound, there is involved a defect that in the case that an electrically conductive electrodeposition paint contains such a substance(s) in an amount necessary for attaining the generally required corrosion resistance in cationic electrodeposition paints, the dispersion is difficult, and a uniform electrically conductive coating fill is hardly obtained."

Thus, it is seen that U.S. Pat. No. 5,275,707 teaches against the use of graphite in coating compositions because: (1) it is said to reduce rust resistance; (2) dispersion of coating compositions containing graphite is said to be difficult; and (3) a uniform electrically conductive coating film is not obtained.

U.S. Pat. No. 5,213,846 discloses a corrosion resistant coating composition comprising (I) 100 parts by weight of a bisphenol type epoxy resin comprising bisphenol skeletons and epichlorohydrin skeletons and having at least two epoxy groups per molecule, said bisphenol skeletons comprising bisphenol A skeletons and bisphenol F skeletons in a weight ratio of from 95:5 to 60:40, and (ii) from 5 to 400 parts by weight of silica particles.

The steel plates treated by the coating composition of U.S. Pat. No. 5,213,846 are likely to be subjected to welding. Therefore, it is preferred to incorporate graphite particles to the coating composition, so that a coating layer having excellent weldability will be obtained. The graphite particles are incorporated to improve the weldability. For this purpose, the particle size thereof is preferably at most 1 µm. Typical commercial products of such graphite particles include, for example, Hitasol GO-102, Hitasol GP-60 and Hitasol GP-82 (tradenames, manufactured by Hitachi Funmatsu Yakin K. K.), and Supercorophite #15, Supercorophite #15Z, Supercorophite #15B, Prophite AS, Prophite W-300D, Baneyphite P-602, Baneyphite BP-4, Baneyphite BP-112, Baneyphite C-812 and Baneyphite C-9A (tradenames, manufactured by Nippon Kokuen Shoji K. K.). The graphite particles are preferably incorporated in an amount of from 0.1 to 30 parts by weight (as solid) per 100 parts by weight of the bisphenol type epoxy resin. If the amount is less than this range, no adequate effects for improvement of the weldability will be obtained. On the other hand, if an excess amount is incorporated, processability during press processing and the corrosion resistance tend to be low. Thus, as before, U.S. Pat. No. 5,213,846 teaches away from using graphite if superior corrosion resistance is desired.

U.S. Pat. No. 4,799,959 discloses improved coating compositions intended to improve the characteristics of a metal substrate, especially threaded substrates. The composition incorporates at least a liquid composition containing hexavalent chromium, and a powdered metal. The composition additionally incorporates a lubricant which is solid at the temperature of use of the substrate. The invention also relates to a process for making use of these compositions and to threaded components coated in this manner.

In the compositions according to U.S. Pat. No. 4,799,959, the solid lubricant, which is preferably a fluorinated polymer such as polytetrafluoroethylene (PTFE), $MoS_2$, or graphite, or their mixtures, is preferably mixed with the particulate metal, but may also be packaged separately. The solid lubricant is preferably in a finely divided form, for example a powder or microspheres, and is preferably dispersed in the presence of a nonionic surface-active agent (dispersant or surfactant) such as a polyethoxy alkylphenol addition compound, for example Triton CF 54 (Rohm and Haas). This surface-active agent is employed in a quantity of between, preferably 1 to 25 grams per liter (g/l) of the total composition, preferably in the proportion of 5 to 10 g/l, because this component clearly improves the resistance of the coatings according to the invention. This surfactant will also permit the dispersion of the various components of the composition, especially the particulate metal. The solid lubricants are employed in quantities such that they result in concentrations by volume of on the order of 0.5 to less than 10% of the dry coating. Clearly, in this case the graphite is present as a lubricant.

U.S. Pat. No. 4,411,742 discloses a high lubricity codeposit of zinc and graphite, and an improved method for depositing the codeposit, is disclosed. The coating is characterized by a coefficient of friction equal to or less than 0.130, and a high resistance to corrosion evidenced by no red rust in a salt spray environment for 72 hours and no destruction due to corrosion in an industrial environment, containing sulphur dioxide, for four months. When the codeposit additionally has a chromate outer coating, the system has a coefficient of friction equal to or less than 0.112 and has no red or white rust in a salt spray environment for at least 120 hours. The codeposit is applied by immersing a cleansed metallic substrate in an acidic zinc plating electrolyte containing at least 40 g/l zinc ions and 30–110 g/l insoluble bulk graphite, with a pH of 5–5.7. The cell of which the electrolyte is a part is energized to plate out a co-deposit; the graphite is continuously agitated while in solution, the agitation being periodically interrupted to allow the graphite to settle and saturate the zinc interface as it is plating out.

U.S. Pat. No. 4,411,742 represents the discovery that a codeposit of zinc and graphite provides an unusually good combination of physical characteristics including a coefficient of friction comparable to cadmium and, in a more particular aspect, an improved method of effectively electrodepositing zinc and graphite onto at least a vertical conductive metal surface. The codeposit is a high lubricity coating material consisting of electrocodeposited zinc and graphite uniformly distributed, the graphite being present in an amount of 30–48% by weight of the codeposit (this percentage of graphite is critical to the success of this codeposit), and the coating having a coefficient of friction equal to or less than 0.130 at a plated thickness of about 0.005 inches showing (a) no red rust in a salt spray environment for at least 72 hours, and (b) no destruction due to corrosion in an industrial environment containing sulphur dioxide after four months. It is preferable that the material have a chemically applied layer of zinc chromate at a thickness of 0.00002 inches so that optimally the coated combination will exhibit consistent torque performance at a torque load of 40 pounds, a coefficient of friction of about 0.112 or less, and no red rust in a salt spray environment for at least 120 hours. When the codeposited coating is applied to a threaded fastener, the fastener will preferably exhibit a consistent torque tension relationship during tightening and have good solderability characteristics using either a resin solder cord or a zinc chloride containing flux.

Importantly, this patent does not contain a vehicle or a binder, and requires that graphite be present at a much higher level than in the present application. Importantly, the present application achieves both excellent cathodic corrosion protection and excellent flexibility and adhesion. Such flexibility and adhesion would be detrimentally affected at the high levels of graphite in the coating of U.S. Pat. No. 4,411,742. Also, the composition of U.S. Pat. No. 4,411,742 is "an electrolytic codeposit", whereas the present composition cannot be described as such. The addition of graphite to the zinc in the compositions of U.S. Pat. No. 4,411,742 reduces the corrosion resistance, whereas the addition of graphite to the present composition improves corrosion resistance.

In any case, there is no disclosure or suggestion or motivation in any of the prior art documents discussed above of the desirability of a soluble graphite containing zinc-rich composition so as to decouple manufacture of the dry composition from use of the solvent.

The present application allows the solvent paint industry, a means of manufacturing solvent coatings, without the utilization of solvent prior to the manufacturing, packaging and shipment of the processed powder. Hence some of the advantages possible in powder coatings are possible by use of the present invention. Some of the advantages of Electrostatic powder coatings are: 1. Solvent-free manufacture, 2. solvent-free application, 3. recovery of over-sprayed powder, 4. no volatile organic content restrictions (VOC), 5. ease of shipment (boxes may be used, not drums), 6. reduced volume (no solvent), and 7. automated heavy volume production possible, etc.

Some of the disadvantages inherent in powder coatings are: 1. high cost of laboratory manufacture and application equipment for moving-line production, 2. the profitability of powder coatings is low, and 3. as primers typically require about 45 weight percent pigment, because of their pigment volume concentration, for effective corrosion resistance, powder primers are virtually non-existent as 45% pigment will not melt on hot metal. This is because zinc powder has zero oil absorption, thereby permitting compositions containing high volumes of zinc powder (up to about 50%), to be extruded and melted easily.

The present invention, by retaining the advantages inherent in powder processing, while allowing the onsite mixing of the compositions of the present invention with solvents, effectively removes the above-listed disadvantages associated with powder coatings technology. Thus, the present invention affords benefits of both technologies, namely powder coatings and solvent-based non-powder technologies.

SUMMARY OF THE INVENTION

It is a primary object of the present invention to provide a dry composition including a binder, a zinc-containing substance and graphite, wherein said dry composition is easily dissolved in a solvent at a site remote from the manufacturing site of the dry composition so as to decouple the dry composition manufacture from use of the solvent.

It is an object of the present invention to provide a low-cost cathodic coating composition having enhanced corrosion protection properties, comprising graphite powder.

It is an object of the present invention to provide a graphite containing zinc-rich coating composition which overcomes the combined disadvantages of present inorganic and organic coating compositions in a cost effective manner.

It is yet another object of the present invention to provide a cathodic coating composition which delivers enhanced corrosion protection to metallic substrates susceptible to environmental attack.

It is also an object of the present invention to provide a cathodic coating composition which coating may be described as a good conductor (or which has a minimum conductivity of 3 ohms/cm$^2$).

It is a still further object of the present invention to provide a cathodic coating composition having greatly improved adhesion to metallic substrates as compared to conventional zinc-rich cathodic coatings.

It is yet another object of the present invention to provide a cathodic coating composition having greatly improved flexibility as compared to conventional zinc-rich cathodic coatings.

It is also an object of the present invention to provide a cathodic coating composition with enhanced water-vapor impermeability.

It is a primary object of the present invention to provide coating compositions with relatively low overall specific gravity, thus allowing easy fluidization, when used in the form of a powder coating.

To achieve the foregoing and other objects, and in accordance with the first aspect of the present invention, there is provided a composition comprising zinc in the form of zinc powder and/or zinc dust, a resin binder, graphite powder, wherein the weight percentage of zinc as part of the combined mount of zinc and binder is from about 75 to about 90%, and graphite is present at a level of about 20–60 weight % of the binder, and wherein said composition is prepared by dry blending of all the ingredients followed by grinding and screening.

In accordance with the second aspect of the present invention, there is provided in a process for the manufacture of a solvent based coating composition, an improvement process for decoupling the use of the solvents from the formation of the remainder of the coating, comprising the steps of: dry blending a mixture of zinc in the form of zinc powder and/or zinc dust, a resin binder and graphite powder, wherein the weight percentage of zinc as part of the combined amount of zinc and binder is from about 75 to about 90%, and graphite is present at a level of about 20–60 weight of the binder; grinding and screening said particles so that the particle size of a substantial majority of said mixture is less than 40 microns; and dissolving said screened mixture in a suitable solvent at a location remote from site of said above two steps.

In accordance with the third aspect of the present invention, there is provided in a coating composition comprising a resin binder, the improvement comprising: from about 50% to 80% of a zinc containing substance; and from about 4 to 20% of graphite.

In accordance with the fourth aspect of the present invention, there is provided a powder coating composition comprising: from about 15 to 20 weight percent epoxy resin; from about 15 to 20 weight percent phenolic hardener; from about 15 to 20 weight percent of a modified zinc phosphate; from about 25 to 35 weight percent of hollow glass microspheres; from about 10 to 15 weight percent of a graphite powder; and from about 10 to 15 weight percent of modified $CaSiO_3$.

In accordance with the fifth aspect of the invention, there is provided an air-dry two part coating composition comprising part A and part B, wherein part A comprises from about 20 to about 30 weight percent of an epoxy resin, from about 10 to 20 percent of a modified zinc phosphate, from about 10 to 15 percent of modified $CaSiO_3$, from about 20–30 weight percent of hollow glass microspheres, from about 10–15 percent of graphite powder and from about 8–12 percent of di-iron phosphide; and wherein part B comprises from about 15–25 weight percent of a curing agent and about 75 to 85 percent of a solvent; part A being easily dissolvable in part B.

Therefore, the present invention provides novel and unobvious coating compositions and processes including the use of graphite for use as protection against corrosion for substrates including but not limited to: 1. Railroad rolling stock; 2. Dams, Bridges and Lift gates; 3. Storage Tanks; 4. Ships and Port Facilities; 5. Guardrails; 6. Transmission Towers; 7. Trucks, Automotive Parts and Chassis; 8. Silos and Grain Storage; 9. Light poles; 10. Gutters and Downspouts; 11.Air Conditioning Equipment; 12. Washers and Dryers; 13. Wire Fencing; 14.Ducting; 15. Corrugated Metal; 16. Pipe, Plumbing and Tubing; 17. Fasteners; 18. Steel Reinforcement Bars; and 19. Off Shore Drilling Platforms.

The following description provides preferred embodiments of the various aspects of this invention, simply by way of illustration, of some of the best modes contemplated for carrying out the invention. As will be realized, the invention is capable of modification in various, obvious aspects all without departing from the invention. Accordingly the description will be regarded as illustrative in nature and not restrictive.

DETAILED DESCRIPTION OF THE INVENTION

Extensive testing has established that with increased cathodic continuity (conductivity) the area of adjacent bare metal protection is proportionately increased. The level of protection afforded to adjacent bare metal is traditionally determined by testing the surface conductivity in ohms/$cm^2$. In the present case, this level of protection was determined by drilling 6–8 mm holes through the coating to bare metal. This testing method reduced the testing period from thousands of hours to less than 500, thereby reducing laboratory test time. Also the method has proved to be conclusive in determining the quality of bare metal protection.

The outstanding corrosion resistance of galvanized metal has made galvanizing the most effective means of long term protection of steel from oxidization and subsequent corrosion or red rust. Guardrails, transmission towers, light poles, electrical equipment and hundreds of application protected by galvanizing have provided cathodic protection for periods up to twenty years. A galvanizing composition comprises essentially pure zinc metal without a binder and therefore is a superior conductor for cathodic protection and provides maximum corrosion resistance when applied over a steel substrate. Its life cycle is determined by: the level of deposition and environmental factors including water ($H_2O$) in its various forms; rain, moisture, saltfog and saltwater in addition to industrial pollutants that can considerably reduce its life cycle. The above-described performance of galvanized coatings in combating corrosion in steel substrates has caused non-galvanized coatings such as the coatings of the present invention to aspire to achieve the same or similar level of protection as galvanized coatings.

To this end, coatings of the present invention (coatings of the present include both sprayable powder coatings as discussed herein, and solvent-based coatings of the present invention whether they are made from the soluble dry compositions of the present invention or not), provide consistent cathodic conductivity throughout the primer surface producing a resistance reading less than 20 K-ohm when tested over a dielectric (non conductive surface), producing cathodic conductivity infinitely greater than can be measured with conventional, prior art zinc dust technology (organic and inorganic). When electrical resistance of approximately 20 K-ohm is achieved (as in the present invention), red rest is prevented for a period in excess of 500 hours, over a primed iron phosphated panel of cold rolled, 1000 bonderize or blasted steel subjected to a 5% NaCl saltfog (conditions equivalent m ASTM, B 117 saltfog exposure), with several 8 mm holes drilled through the panel. Conventional organic zinc-rich primers manufactured with zinc dust provide only limited area protection to exposed bare metal (limited to a scribed area), due to zinc dust's lower conductivity caused by oxidation during manufacture. Thus, conventional organic zinc-rich coatings with an epoxy resin as the fill-forming substance (with a 90% zinc content), on the other hand, will develop total red rest in the drilled areas within a few days when exposed to the same environment.

The following list describes several important and unique properties achieved by the coatings of the present invention: 1. Density: The weight per gallon at equal volume solids is considerably reduced due to an effective lower zinc to binder ratio; 2. Cost: Up to a 30% lower raw material at equal volume solids; 3. Sedimentation: Soft setting is consistent throughout this development as all formulae are relatively thixotropic; 4. Application over Phosphated Steel: A dramatic increase in cathodic continuity and conductivity is effective in producing protective white rust to adjacent bare metal. (several 8 mm holes drilled through the coating remained free of red rust in excess of 500 hours); 5. Flexibility: Organic zinc rich formulae including powder consistently provide 160 lbs front and reverse impact resistance, an essential requirement for reinforcement bars or over coil coated or steel that is to be postformed; 6. Deposition: The thixotropic property of this development permits depositions up to 125 microns without sagging; 7. Application Properties: With the exception of the powder development all primers can be formulated for spray, brush, dip or roller coat application; 8. Low Density Microsphere Primers: Zinc coated microspheres produce effective zinc rich organic primers at less than 12 lbs/gal at 55% volume solids; 9. Ease of Recoatability: All development both inorganic and organic are recoatable with conventional solvent and waterborne topcoats; 10. User Friendly Inorganic Zinc primers: Manufacturing, packaging and storage of the single component moisture cured ethyl silicate development does not require a nitrogen blanket. Packaged material can be opened and closed repeatedly without risk of gelling; a problem consistent with inorganic zinc rich primers exposed to moisture; 11. Color Development: Primers containing mostly zinc powder can be tinted to match hundreds of light and medium tone industrial primers; 12. Ease of Spot Welding: The ultra high conductivity of this development provides superior welding properties; 13. VOCs: Both the inorganic and organic primers can be formulated to achieve a VOC of 2.94 or lower; 14. Powder Application: This development is available in both epoxy and polyester primers providing exceptional anti-corrosion resistance.

With respect to the process aspect of the present invention, it has been found that fine particle-size graphite (approximately 10 microns) is preferred for providing high conductivity to the remainder of the composition for application over treated metal (zinc and iron phosphate). Graphite reduces the apparent density of the compositions disclosed herein from plus or minus 2.2 to plus or minus 1.3, thereby providing a thixotropic solution when the solvent or resin-solvent solution (curing agent-solvent solution) is added at the application facility factory or maintenance site (such as a bridge or a dam, etc.). Without the graphite, hard settling would happen, which is obviously unacceptable. This invention permits the manufacturing and shipment of corrosion-resistant primers without the utilization of solvent.

All final coatings of this invention include powdered graphite dispersed uniformly throughout the thickness of the coating. From about 4 to 20% of graphite by weight of the total composition is necessary for the practice of this invention. Powdered graphite Grade No. 4014 or A99 from Ashbury Graphite Mills, Inc., are all suitable for the practice of this invention. 4014 has 95% of its weight comprised of particles between 5 and 10 microns. The graphite content of the compositions of the present invention result in producing resistance readings in the dried coatings of less than 20 K-ohm when tested over a dielectric (non-conductive surface), producing cathodic conductivity infinitely greater than can be measured with conventional zinc dust technology (organic and inorganic).

The binder resins of the present invention may be alkyl silicate, epoxy resins (powder and non-powder) and other well known equivalents thereof including epoxy esters or polyester resins. Polyester resins are not suitable the decoupling process of the present invention or for the dry compositions used therein as they do not dissolve in common solvents.

For a powder coating wherein a polyester resin is not the film-forming substance, it is required that an anti-sintering agent be present. In such cases, "AEROSIL" 972 which is amorphous silica (amorphous silane-treated pyrogenic silica), may be used as the anti-sintering agent, in the range from 0.1 to 0.3% by weight. Clearly, the dry compositions of the present invention are volatile-free, but all the coating compositions of the present invention may be volatile-free or volatile containing coatings.

In case of a powder coating, the presence of an antisintering agent is necessary to reduce sintering during manufacturing or storage. Amorphous silica may be produced by high temperature hydrolysis of silicon tetrachloride or by transformation of silica in an electric arc. Preferred pyrogenic amorphous silicas include those sold under the trademark "AEROSIL" by Degussa, and under the trademark "CABOSIL" by Cabot Corporation. "AEROSIL" 300 has an average particle size of about 0.007 micron. "AEROSIL" 972 is silane treated and has an average particle size of about 0.018 micron, while "AEROSIL" 974 has an average particle size of 0.008 micron.

For a powder coating application, the presence of a curing agent/hardener is necessary. It is preferred that about 0. 1% to 0.3% by weight of the total weight of the composition, of a hardener be present. EPI-CURE® 3214 by Shell Chemicals (comprises about 42% bisphenol epoxy resin/diethylene triamine adduct, about 14.6% propylene glycol monourethyl ether, about 27% n-butyl alcohol, about 10.4% toluene and about 6% diethylene triamine), Vestagon® B-68 by HÜLS AMERICA, Inc. and Vestagon® B-31 by HÜLS AMERICA, Inc. (both cyclic amidines), may be used as curing agents in the practice of this invention. HÜLS B-31 imparts a gloss finish to the final coating, whereas the B-68 imparts a matt finish to the final coating.

For a powder coating, 0.3–1 weight percent of a flow control agent is preferred. A flow control agent makes the coating generally smoother by affecting the flow characteristics of the coating when it is in the molten state. BYK®-365 P (a polyacrylate adsorbed on silicon dioxide), by Byk-Chemie is the preferred flow control agent. For a powder coating, 0.1–0.3% of "Aluminum oxide C" (DeGussa), as an electrostatic charge modifier may be post-added for ease in electrostatic spraying.

Zinc powder is available from Zinc Corporation of America (ZCA). ZCA 1239, having a particle size 95% between 20 and 60 microns, is preferred. As described above, the average particle size for zinc powder is between 20 and 60 microns. Below 20 microns, metallic zinc is zinc dust. Zinc dust #6 by Purity Zinc is preferred. If zinc-coated hollow microspheres are used in the coating compositions of the present invention, microspheres having an average diameter of about 2.5 to about 60 microns are preferred. Such a product is sold by The PQ Corporation under the trademark "Metalite"-Zinc SF. It has a bulk density of about 0.85 gram per cubic centimeter, i.e., about 0.119 times the bulk density of the powdered zinc. As indicated in the above description of U.S. Pat. No. 4,621,024 the glass-like microspheres may be fly ash, which comprise about 80% to 96% by weight alumina-silica, with small amounts of iron oxide, alkaline earth metal oxides and alkali metal oxides. The zinc coating ranges from about 15% to about 30% by weight, relative to the weight of the adhesive binder-coated microspheres.

The resin binder can be any resin soluble or easily dispersable in a solvent, preferably an epoxy powder. As is well known, epoxy resins are the reaction product of an epihalohydrin and a polyol. Shown here is the chemical structure of a bisphenol A epoxy and for an epoxy novalac.

Compositions 1, 2, 4 and 5 disclose dry compositions utilized in the decoupling process of the present invention.

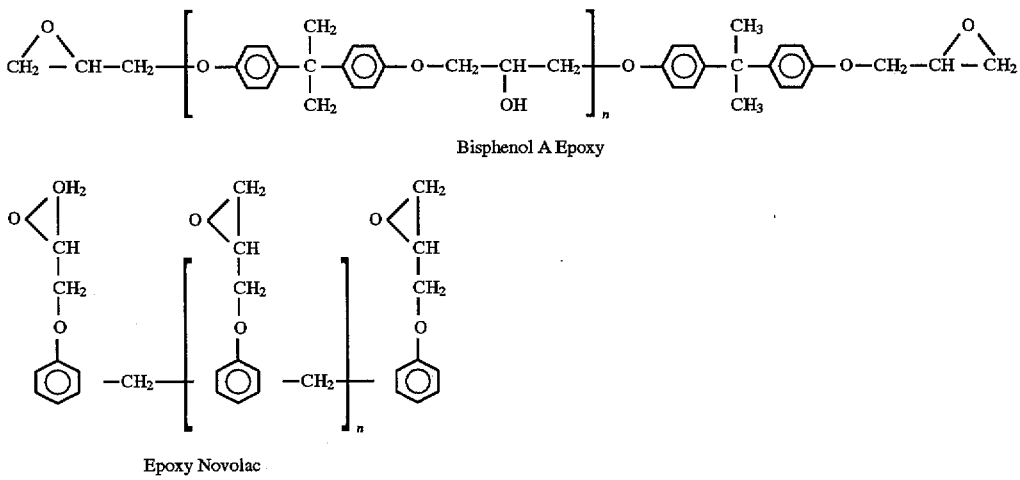

Bisphenol A Epoxy

Epoxy Novolac

Hardening or crosslinking agents for epoxy resins include at least one compound with an —NH$_2$, —CONH$_2$, —NHR, —CONHR, and/or —COOH functional group, which reacts with the epoxy function. The preparation of epoxy resins and crosslinking reactions are described in U.S. Pat. No. 3,954,693, issued May, 1976 to C. C. Fong, the disclosure of which is incorporated by reference. Epoxy resins suitable for use in the present invention include those produced by Shell Chemical Company under the trademarks "EPON 3001 (modified bisphenol A/epichlorohydrin resin)" and "EPON 828", and by Ciba-Geigy Co. under the trademark "488-60 Epoxy". Other equivalent epoxy resins are commercially available and may be used.

Preferably, the epoxy powder has an epoxide value (equivalent weight) of between 425 and 1000, more preferably 450-800. More preferably, the weight ratio of the total zinc content of the combination to the total of the zinc, the epoxy and the hardener, is at least 0.8.

When alkyl silicate is the desired binder, a substantially anhydrous ethyl silicate solution in ethanol containing 27% ethyl polysilicate, 52% ethylene glycol monoethyl ether and 13% ethanol (about 40% by weight solids), suitable for use in the present invention, is sold by Silbond Corp. under the tradename "SILBOND® H-12A". Pure ethyl silicate with the trade name "SILBOND® Pure (which has few restrictions, if any, on its use with respect to Federal, State or local environmental laws or regulations) may also be used. "SILBOND® Pure is an inorganic solvent evaporating rapidly from the coating and is thereby very effective in helping to meet stringent new VOC standards (greater the amount of inorganic "SILBOND® Pure used less volatiles are required). In alkyl silicate based coatings, an optimum amount of a catalyst is required so as to accelerate the reaction between the silicate, the zinc and the substrate. An optimum mount of an anti-settling agent and an optimum amount of a wetting agent are also required. Preferably, the catalyst is crystalline silica present in an amount of up to 5% by total weight of the composition, the anti-settling agent being amorphous silica present in an amount from about 0.5 to 1.5% by total weight of the composition and the wetting agent is Anti Terra 204 (an electroneutral solution of higher molecular weight carboxylic acid salts of polyamine amides), by BYK Chemie, present in an amount from about 0.1 to 1% by total weight of the composition.

As stated before, the dry compositions can be manufactured at any site having grinding machines such as Hammermills, sold under the trademark SEPOR®. The dry components are first mixed and then reduced in size, preferably by Hammermills, as stated before. Size reduction is the key, however, and hence any suitable means may be used advantageously to achieve this goal. Ball milling or pebble milling is also possible. Preferably, all particles above 40 microns are removed by sieving or other convenient means. Once made, the dry compositions may be conveniently shipped in boxes without any appreciable environmental concerns.

This powder can then be dissolved at the size where the coating is to be applied, in a common solvent. The solubility of the dry composition is the key.

A solvent-based epoxy resin containing coating is disclosed as examples 6, 8 and 11. EPON 3001 by Shell is one of the preferred resins. An optimum mount of an anti-settling agent, an optimum amount of a curing agent and an optimum amount of a wetting agent are required for this coating. Preferably, the anti-settling agent is amorphous silica present in an amount from about 0.5 to 1.5% by total weight of the composition, the curing agent is present in an amount from 3 to 10% by total weight of the composition and the wetting agent is present in an amount from about 0.1 to 1% by total weight of the composition. The curing agent may be cured at ambient temperatures preferably with Epicure 3214 by Shell or Resimine 717 curing agent for baked coatings by Monsanto and the wetting agent is either Dispersbyk®-181 (a solution of an alkanol ammonium salt of a polyfunctional polymer having anionic/non-ionic character) and/or Antiterra 204 by BYK Chemie.

A solvent-based "air-dry" coating containing an epoxy ester as the film-forming substance may also be prepared as seen in example 5. Various dryers are used to catalyze the oxygen cure. Preferred dryers are cobalt, calcium and zirconium and combinations thereof.

Coatings of the present invention are especially suited for use as cathodic coatings. The zinc-containing substances constitute the conductive phase and are used as a "sacrificial anode". Zinc is selected because it has a more negative standard electrode potential than iron, which is the most common substrate. The zinc in the coating is thus anodic with respect to the iron. Therefore, the transformation of iron into soluble ions, which mechanism forms the gist of the corrosion phenomenon, is considerably inhibited. The zinc corrodes by forming zinc oxide and zinc carbonate, which in turn further prevents corrosion. The dried film, in order to give effective cathodic protection to steel, should contain zinc in a volume such that the particles are in electrical contact. The zinc microspheres, if used, aid in this desired configuration of the zinc particles.

Coatings of the present invention are prepared by mixing together the ingredients listed above or those in the specific examples. Preferably, the lighter ingredients are mixed together prior to the addition of the heavier components. In case of powder coating compositions, a two screw extruder with the capability to extrude materials of high density is preferred for obtaining optimum even distribution of the raw materials. The extruder used in testing the coatings of the present invention was the MP-PC™ series Powder Coatings Twin Screw Extruder by APV. It is preferred that the zinc-containing materials be fed separately from all the other raw materials. The other raw materials are preferably pre-mixed before feeding them separate from the zinc-containing materials. If separate feeding is used, it is desirable that the two feeders are capable of being controlled so as to add the raw materials in the correct ratio. The post-extrusion powder should ideally have a bulk density of below 2 gms/cc for effective fluidization during electrostatic spraying of the powder. In order to provide optimum electrostatic conductivity during spraying, from about 0.1 to about 0.3 weight percent of electrostatic charge modifier such as aluminum oxide may be post-added to the extruded powder. It is important that the powder to be sprayed have a consistent bulk density. Re-extrusion is recommended, if inconsistencies are observed. Partial polymerization of the epoxy resin may be avoided by maintaining a low extrusion temperature. The powder may then be sprayed electrostatically as is well known in the powder coatings industry.

Potter Industries, an affiliate of the PQ Corporation, sells their hollow glass microspheres under the trademark SPHERICELS. SPHERICELS are available in a single size, entitled 110P8. The 110P8 microspheres are slightly heavier than water (in terms of specific gravity) and have a bulk density of 1.1 gms/cc. They have a crush strength of greater than 10,000 psi. They have surface oil absorption of 43.5 gms oil/100 cc of glass bubbles. The average particle size is approximately 10 microns.

The following specific examples are given to illustrate preferred embodiments of compositions of the invention but are not to be construed as a limitation on the invention herein claimed.

EXAMPLE 1

A baking powder is disclosed which powder may be post-blended with the solvent blend reduction given below to yield a solvent-based coating.

| Percent | Material | Manufacturer |
|---|---|---|
| 9.5 | Novolac-modified Epoxy resin EPON 2012 | Shell Chemical |
| 3 | Phenolic Hardener DEH 84 | Dow Chemical |
| 1.5 | Phenolic Hardener DEH 85 | Dow Chemical |
| 50 | zinc powder 1239 (Particle size 95% between 20 and 60 microns) | ZCA |
| 23 | zinc dust 15G (Particle size 95% between 8 and 12 microns) | Purity Zinc |
| 5 | zinc dust #4 (Particle size 95% between 2 and 5 microns) | Purity Zinc |
| 7.5 | Graphite 4014 (Particle size 95% between 5 and 10 microns) | Ashbury Graphite |
| 0.3 | Aerosil 972 (Amorphous, silane treated pyrogenic silica) | Degussa |

SOLVENT BLEND REDUCTION

| Percent | Material | Manufacturer |
|---|---|---|
| 10 | MIBK | Eastman |
| 9 | Xylol 100 | Ashland |
| 1 | Butanol | Eastman |

20 (total of 120)
(Zinc to binder 84%, graphite as proportion of binder 53%)

EXAMPLE 2

A two component air-dry epoxy coating is disclosed, wherein the first component is dissolvable in the second component.

| Percent | Material | Manufacturer |
|---|---|---|
| 10.5 | DLR 6225 (Bisphenol A Epoxy) | Dow Chemical |
| 50 | zinc powder 1239 (Particle size 95% between 20 and 60 microns) | ZCA |
| 15 | zinc dust 15G (Particle size 95% between 8 and 12 microns) | Purity Zinc |
| 6.5 | zinc dust #4 (Particle size 95% between 2 and 5 microns) | Purity Zinc |
| 10 | di-iron phosphide Ferrophos 31 | Oxy Chemical |
| 0.5 | Aerosol 972 (Amorphous, silane treated pyrogenic silica) | Degussa |
| 7.5 | Graphite 4014 (Particle size 95% between 5 and 10 microns) | Ashbury |
| 6.5 | Curing agent Epicure ® X-70-8515 | Shell Chemical |
| 7.5 | Methyl isobutyl ketone (MIBK) | Eastman |
| 5 | Xylol | Ashland |
| 1 | Solvent - Butanol | Eastman |

20 (total of 120)
(Zinc to binder 87%, graphite as proportion of binder 44%)

EXAMPLE 3

A baking industrial primer is disclosed.

| Percent | Material | Manufacturer |
|---|---|---|
| 16.2 | EPON 2012 | Shell Chemical |
| 18 | DEH 85 | Dow Chemical |
| 12.8 | Graphite 4014 | Ashbury Graphite |
| 17.1 | Modified zinc phosphate (ZMP) | Heucotech LTD |
| 17.1 | Borosilicate microspheres, 95% between 6–8 microns (Zeospheres 200) | 3M |
| 12.8 | modified $CaSiO_3$ comprises 47% CaO, 50% $SiO_2$, and trace amounts of $Fe_2O_3$, $Al_2O_3$, MnO, MgO and $TiO_2$ | Nyco |
| 6 | Hollow glass microspheres (Sphericels 110P8) | PQ Corp. |

The baking cycle is 20 minutes at 350° F.
(graphite as proportion of binder 37%).

EXAMPLE 4

An air dry two component primer is disclosed, wherein said first component is easily dissolvable in the second component.

| Percent | Material | Manufacturer |
|---|---|---|
| 25 | bisphenol A epoxy DEH 6225 | Dow Chemical |
| 15 | Modified zinc phosphate (ZMP) | Heucotech Ltd. |
| 13 | modified $CaSiO_3$ | Nyco |
| 18 | borosilicate microspeheres (Zeospheres 200) | 3M |
| 6 | glass microspheres (Sphericels 110) | PQ Corp. |
| 13 | 4014 Graphite | Ashbury Graphite |
| 10 | Ferrophos 31 | Oxy Chemical |
| 13 | Epicure Epicure ® X-70-8515 | Shell Chemical |
| 15 | MIBK | Eastman Chemical |
| 10 | Xylol | Ashland Oil |
| 6 | Butanol | Eastman Chemical |

54 (total of 154)
(graphite as proportion of binder 50%)

EXAMPLE 5

Part A

| Percent | Material | Manufacturer |
|---|---|---|
| 3.5 | Epoxy resin (Epon 3001) | Shell Chemicals |
| 30 | Zinc Powder No. 1239 | Zinc Corp. America |
| 45 | Zinc Dust (#4) | Zinc Corp. America |
| 14 | di-iron phosphide Ferrophos 31 | Oxy Chemical |
| 7.5 | Graphite powder 4014 | Ashbury Graphite |

Part B

| | | |
|---|---|---|
| 33 | Silbond H-12A | Silbond |
| 6 | Pure Silbond | Silbond |
| 1.4 | Anti-settling agent Byk ®-410 | |

40.4 (total 140.4)

EXAMPLE 6

A single component inorganic zinc primer coating composition was prepared by mixing the constituents listed below. The quantifies are in percent by weight based on the total weight:

| Percent | Material | Manufacturer |
|---|---|---|
| 30.6 | Ethyl silicate solution, 40% by weight solids (Silbond H-12A) | Silbond |
| 4.5 | Pure Ethyl silicate solution (Pure Silbond) | Silbond |
| 26.6 | Zinc Powder (1239) | Zinc Corporation of America |
| 26.6 | Zinc Dust (#6) | Purity Zinc |
| 2.8 | Crystalline silica, 9 microns (Novacite 337) | Malvern Minerals |
| 0.9 | Amorphous silica, 0.007 microns (Aerosil 300, pyrogenic silica) | Degussa |
| 7.5 | Graphite powder (A-4014) | Ashbury |
| 0.5 | Wetting agent (Anti Terra 204 nonionic) | BYK Chemie |

(graphite as proportion of binder 21%)

EXAMPLE 7

A two component zinc microsphere epoxy coating composition was prepared by mixing the constituents listed below. The quantities are in percent by weight based on the total weight:

Part A

| Percent | Material | Manufacturer |
|---|---|---|
| 13.8 | Epoxy resin (Epon 3001) | Shell Chemicals |
| 24.6 | Zinc Powder (1239) | Zinc Corp. America |
| 24.6 | Zinc Dust (#44) | Zinc Corp. America |
| 5.9 | Zinc-coated microspheres (Metallite - Zinc SF, particle size 2.5–60 microns) | PQ Corp. |
| 0.4 | Wetting agent (Dispersbyk ®- 181) | BYK Chemie |
| 8.2 | Graphite powder (A 4014) | Ashbury |
| 0.9 | Amorphous silica (aerosil 972 silane treated pyrogenic silica) | Degussa |
| 12.3 | Solvent Blend (50 methyl isobutyl ketone 50 xylol) | Eastman, Ashland |

(zinc to binder 79%, graphite as proportion of binder 59%)

Part B

| | | |
|---|---|---|
| 7.0 | Epicure 3214 | Shell |
| 2.1 | Co-solvent (Butanol) | Shell |

EXAMPLE 8

A two component inorganic zinc rich primer coating composition was prepared by mixing the constituents below. The quantities are in percent by weight based on the total weight:

Part A

| Percent | Material | Manufacturer |
|---|---|---|
| 32.0 | Ethyl silicate solution, 29% by weight solids (Silbond H-6-C) | Silbond |
| 2.5 | Crystalline silica, 9 microns (Novacite 337) | Malvern Minerals |
| 8.0 | Graphite powder (A-4014) | Ashbury |
| 1.0 | Suspension agent, amorphous silica, 0.007 microns (Aerosil 300, pyrogenic silica) | Degussa |
| 0.5 | Wetting agent (Anti Terra 204 nonionic) | BYK Chemie |

Part B

| Percent | Material | Manufacturer |
|---|---|---|
| 28.0 | Zinc Powder (1239) | Zinc Corporation of America |
| 28.0 | Zinc Dust (#6) | Purity Zinc |

Instructions: Add part B to Part A, mixing for approximately 10 minutes prior to application (graphite as proportion of binder 25%).

EXAMPLE 9

A two component epoxy coating composition was prepared by mixing the constituents listed below. The quantities are in percent by weight based on the total weight:

Part A

| Percent | Material | Manufacturer |
|---|---|---|
| 11.8 | Epoxy resin (Epon 3001) | Shell Chemicals |
| 38.7 | Zinc Powder (1239) | Zinc Corp. of America |
| 20.5 | Zinc Dust (#44) | Zinc Corp. of America |
| 6.8 | Graphite (A-4014) | Ashbury |
| 0.9 | Amorphous silica (aerosil 972 silane treated pyrogenic silica) | Degussa |
| 0.4 | Dispersbyk ®-181 | BYK Chemie |
| 0.4 | Wetting agent (Anti Terra 204 nonionic) | BYK Chemie |
| 12.5 | Solvent Blend (50% methyl isobutyl ketone plus 50% xylol) | BYK Chemie |

Part B

| Percent | Material | Manufacturer |
|---|---|---|
| 5.9 | Epicure 3214 | Shell |
| 3.2 | Butanol | Shell |

(zinc binder 83%, graphite as proportion of binder 57%)

(zinc binder 83%, graphite as proportion of binder 57%)

EXAMPLE 10

A single component air dry primer coating composition was prepared by mixing the constituents listed below. The quantities are in percent by weight based on the total weight:

| Percent | Material | Manufacturer |
|---|---|---|
| 23.4 | Epoxy Ester (38-411) | Reichhold |
| 7.8 | Solvent Blend (50% methyl ethyl ketone plus 50% mineral spirits) | |
| 29.2 | Zinc Dust (#44) | Zinc Corp. of America |
| 29.2 | Zinc Powder (1239) | Zinc Corp. of America |
| 7.8 | Graphite (A-4014) | Ashbury |

-continued

| Percent | Material | Manufacturer |
|---|---|---|
| 0.8 | Amorphous silica (aerosil 972 silane treated pyrogenic silica) | Degussa |
| 0.2 | 6% Cobalt solution | Huls |
| 0.3 | 6% Calcium solution | Huls |
| 0.6 | 12% Zirconium solution | Mooney |
| 0.3 | Wetting agent (Anti Terra 204 nonionic) | BYK Chemie |
| 0.3 | Dispersbyk ®-181 | BYK Chemie |
| 0.1 | Anti Skim #2 | Huls |

(graphite as proportion of binder 33%)

EXAMPLE 11

A polyester resin based zinc rich powder coating composition was prepared by mixing the constituents listed below. The quantifies are in percent by weight based on the total weight:

| Percent | Material | Manufacturer |
|---|---|---|
| 16.4 | Polyester Resin (3065) | McWorter |
| 0.9 | Curing Agent (XL-552) | Rohm & Haas |
| 38.0 | Zinc Powder (1239) | Zinc Corp. of America |
| 38.0 | Zinc Dust (#44) | Zinc Corp. of America |
| 6.5 | Graphite (A-4014) | Ashbury |
| 0.2 | "aluminum oxide C" post added to improve electrostatic charge | Degussa |

(zinc to binder 82%, graphite as proportion binder 39%)

EXAMPLE 12

A coating composition was prepared by mixing the constituents listed below. The quantities are in percent by weight based on the total weight:

| Percent | Material | Manufacturer |
|---|---|---|
| 11.5 | Epoxy resin (Epon 3001) | Shell |
| 3.0 | Melamine curing agent (Resimine 717) | Monsanto |
| 30.5 | Zinc dust (#44) | ZCA |
| 30.5 | Zinc Powder (1239) | ZCA |
| 8.5 | Graphite (A-4014) | Ashbury |
| 1.0 | Amorphous silica (aerosil 972 silane treated pyrogenic silica) | Degussa |
| 0.4 | Dispersbyk ®-181 | BYK Chemie |
| 0.4 | Wetting agent (Anti Terra 204 nonionic) | BYK Chemie |
| 14.2 | Solvent Blend (40% methyl isobutyl ketone plus 10% butanol plus 50% xylol) | |

(zinc to binder 86%, graphite as proportion of binder 42%)

EXAMPLE 13

A zinc-rich electrostatic powder primer coating composition was prepared by mixing the constituents listed below. The quantifies are in percent by weight based on the total weight:

| Percent | Material | Manufacturer |
|---------|----------|--------------|
| 16.0 | epoxy resin Epon 3001 | Shell |
| 2.5 | curing agent Huls B-31 | Huls America |
| 0.3 | flow control agent BYK 365-P | BYK Chemie |
| 48.5 | Zinc Powder 1239 | ZCA |
| 25.5 | Zinc Dust #44 | ZCA |
| 6.8 | conductive agent Graphite (A-4014) | Ashbury |
| 0.2 | Hydrophobic silica Aerosil 972 | Degussa |
| 0.2 | electrostatic charge modifier Aluminum oxide © | Degussa |

(zinc to binder 82%, graphite as part of binder 42%)

Thus, it is apparent that there has been provided, in accordance with the invention, a coating composition comprising graphite powder, which fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and broad scope of the appended claims.

What is claimed is:

1. A powder coating composition comprising zinc in the form of zinc powder and/or zinc dust, a resin binder selected from the group consisting of epoxy resins, polyester resins and mixtures thereof, graphite powder, wherein the weight percentage of zinc as part of the combined amount of zinc and binder is from about 75 to about 90%, and graphite is present at a level of about 20–60 weight % of the binder.

2. The composition of claim 1, wherein said powder coating composition has a particle size of less than 40 microns.

3. The composition of claim 2, further comprising a curing agent.

4. The composition of claim 3, wherein said curing agents are selected from the group consisting of polyacrylates, polyurethanes, aromatic amines, cyclic amines, amine adducts, cyclic amidines, dicyandiamides and accelerated dicyandiamides.

5. The composition of claim 1 wherein said binder resin is a solid bisphenol A epoxy.

6. The composition of claim 5, wherein an epoxy resin has an epoxide value ranging from between 425 and 1,000.

7. The composition of claim 1 wherein said binder resin is an epoxy novolac.

8. The composition of claim 7, wherein said epoxy novolac is an epoxy resin modified with about 14–19% formaldehyde novolac.

9. The composition of claim 1, wherein di-iron phosphide replaces up to 35% of the zinc.

10. The composition of claim 1, wherein the weight percentage of zinc as part of the combined amount of zinc and binder is from about 79 to about 87%, and graphite is present at a level of about 39 to about 59 weight % of the binder.

11. The composition of claim 1, wherein said graphite powder is approximately 10 microns in average particle size.

12. In a process for the manufacture of a solvent based coating composition, an improvement process for decoupling the use of the solvents from the formation of the remainder of the coating, comprising the steps of:

dry blending a mixture of zinc in the form of zinc powder and/or zinc dust, a resin binder selected from the group consisting of epoxy resins, polyester resins and mixtures thereof and graphite powder, wherein the weight percentage of zinc as part of the combined amount of zinc and binder is from about 75 to about 90%, and graphite is present at a level of about 20–60 weight % of the binder;

grinding and screening said particles so that the particle size of a substantial majority of said mixture is less than 40 microns; and dissolving said screened mixture in a suitable solvent at a location remote from site of said above two steps.

13. The process of claim 12, wherein said solvent is selected from the group consisting of ketones, acetates, alcohols, aromatic solvents, aliphatic solvents and mixtures of the above.

14. The process of claim 13, wherein said dry blending includes a curing agent, said curing agent also being soluble in said solvent.

15. The process of claim 14, wherein said curing agents are selected from the group consisting of polyacrylates, polyurethanes, aromatic amines, cyclic amines, amine adducts, cyclic amidines, dicyandiamides and accelerated dicyandiamides.

16. The process of claim 12 wherein said binder resin is a solid bisphenol A epoxy.

17. The process of claim 16, wherein said an epoxy resin has an equivalent weight ranging from between 425 and 1,000.

18. The process of claim 12 wherein said binder resin is an epoxy novolac.

19. The process of claim 18, wherein said epoxy novolac is an epoxy resin modified with about 14–19% formaldehyde novolac.

20. The process of claim 12, wherein di-iron phosphide replaces up to 35% of the zinc.

21. The process of claim 12, wherein the weight percentage of zinc as part of the combined amount of zinc and binder is from about 79 to about 87%, and graphite is present at a level of about 39 to about 59 weight % of the binder.

22. The process of claim 12, wherein said graphite powder is approximately microns in average particle size.

23. A solvent-based coating composition comprising a resin binder, selected from the group consisting of epoxy resins, epoxy ester resins, polyester resins and mixtures thereof, the composition comprising:

from about 50% to 80% of a zinc containing substance selected from the group consisting of zinc powder, zinc dust, zinc-coated microspheres and mixtures thereof;

from about 4 to 20% of graphite; and at least about 10% solvent.

24. The composition of claim 23, further comprising from about 10 to 20% solvent.

25. The coating composition of claim 23, wherein binder comprises from about 10% to 30% of an epoxy resin as a film forming substance; from about 50% to 75% of said zinc containing substance; the composition further comprising an anti-settling agent; a curing agent; and a wetting agent.

26. The composition of claim 25, wherein said anti-settling agent is amorphous silica present in an amount from about 0.5 to 1.5% by total weight of the composition, the curing agent is present in an amount from 3 to 10% by total weight of the composition and said wetting agent is present in an amount from about 0.1 to 1% by total weight of the composition.

27. The composition of claim 23, wherein said epoxy resin has an epoxide value of between 450 and 800.

28. The composition of claim 23, wherein the weight ratio of the total zinc content of the combination to the total of the zinc containing substance, the epoxy and the curing agent, is at least 0.8.

29. The composition of claim 25, wherein said epoxy resin is an epoxy ester.

30. The coating composition of claim 23, and wherein said binder comprises from about 10% to 20% of a polyester resin; wherein from about 60% to 80% of said zinc containing substance is present.

31. The composition of claim 23, wherein said solvent includes liquid curing agents.

32. The composition of claim 31, wherein said liquid curing agents are selected from the group consisting of amidoamines, polyamides, phenolics, aliphatic amines, melamines, cylcolaiphatic amines and ketimines.

33. The composition of claim 31, wherein said composition further includes soluble pigments selected from the group consisting of zinc phosphates, iron oxides, borosilicate hollow glass microspheres, silicas, titanium dioxide, carbon black, chromium oxide, zinc oxide and fumed silica.

34. The process of claim 13, wherein said solvent includes liquid curing, agents.

35. The process of claim 34, wherein said liquid curing agents are selected from the group consisting of amidoamines, polyamides, phenolics, aliphatic amines, melamines, cylcolaiphatic amines and ketimines.

36. The mixture of claim 35, wherein said mixture further includes soluble pigments selected from the group consisting of zinc phosphates, iron oxides, borosilicate hollow glass microspheres, silicas, titanium dioxide, carbon black, chromium oxide, zinc oxide and fumed silica.

* * * * *